UNITED STATES PATENT OFFICE.

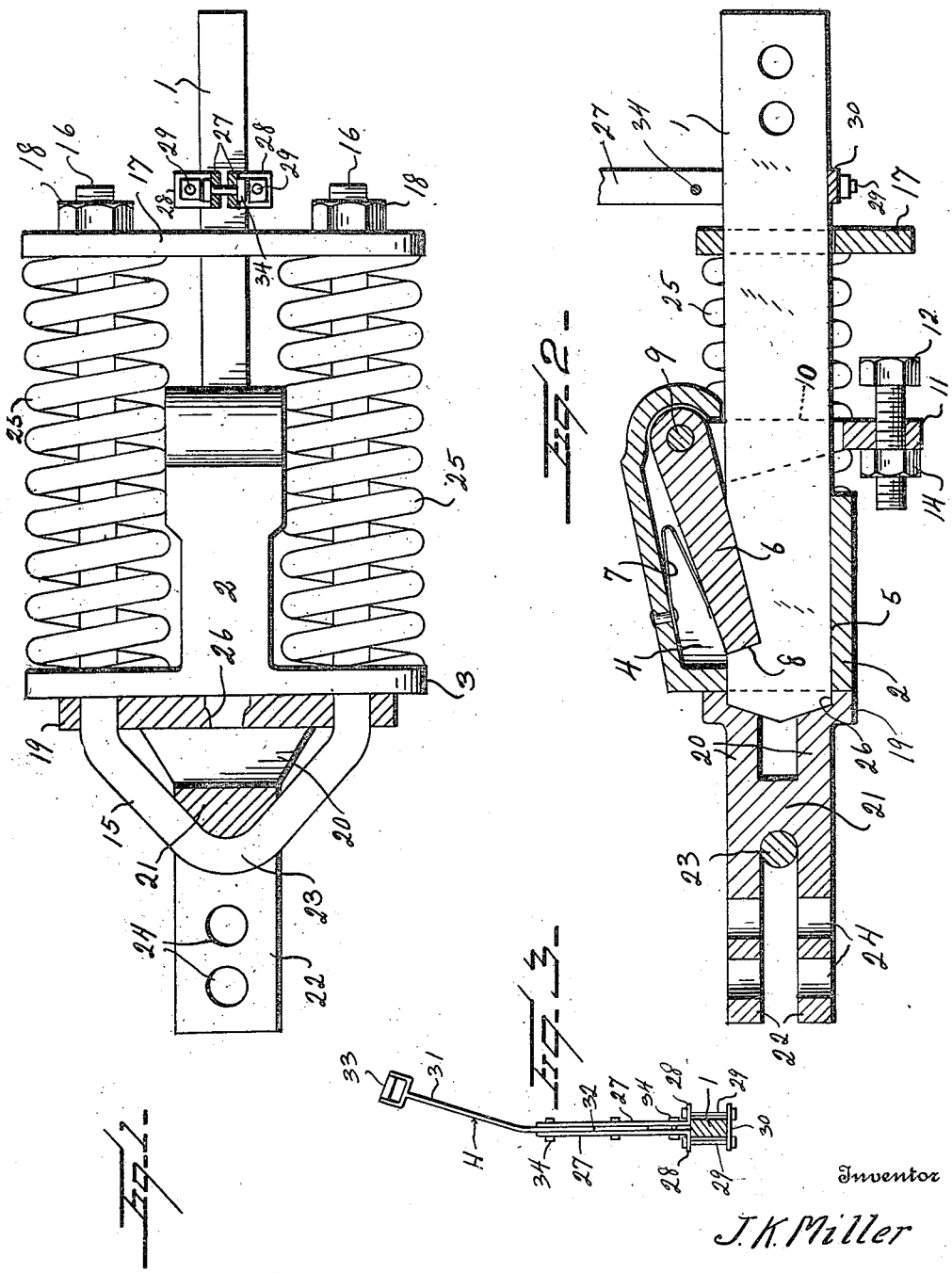

JOHN K. MILLER, OF MARSHALL, MINNESOTA.

TRACTOR-HITCH.

1,379,874.  Specification of Letters Patent.  Patented May 31, 1921.

Application filed April 13, 1921. Serial No. 460,977.

*To all whom it may concern:*

Be it known that I, JOHN K. MILLER, a citizen of the United States, residing at Marshall, in the county of Lyon and State of Minnesota, have invented certain new and useful Improvements in Tractor-Hitches, of which the following is a specification, reference being had to the accompanying drawings.

This invention relates to improvements in tractor hitches, and it is an object of the invention to provide a device of this general character with novel and improved means whereby a release will be effected automatically upon undue strain being imposed upon the hitch.

Another object of the invention is to provide a novel and improved device of this general character embodying two members normally coupled or locked in assembled relation, together with means operating automatically to unlock or uncouple said members when undue strain is imposed upon the hitch.

The invention consists in the details of construction and in the combination and arrangement of the several parts of my improved tractor hitch whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view partly in top plan and partly in section of a hitch constructed in accordance with an embodiment of my invention;

Fig. 2 is a view partly in side elevation and partly in longitudinal section of the structure as illustrated in Fig. 1; and Fig. 3 is a fragmentary view partly in elevation and partly in section illustrating the means to lift the draw-bar when it is desired to recouple.

As disclosed in the accompanying drawings, 1 denotes a draw-bar adapted to be attached in any desired manner to a machine or implement to be drawn. The outer or forward end portion of the bar 1 is adapted to be received within an elongated socket member 2 provided at its outer end portion with a cross head 3 extending beyond opposite sides thereof. The socket member 2 is provided at one side thereof with a chamber or compartment 4 opening directly into the socket or bore 5 of the member 2.

Pivotally engaged within the inner end portion of the chamber or compartment 4 is an end portion of an arm or dog 6, said dog 6 extending forwardly and having its forward or free end portion constantly urged inwardly of the socket or bore 5 by the spring 7. The bar 1 adjacent its forward end is provided with a notch or recess 8 in which the free or forward end portion of the dog or arm 6 seats when the bar 1 is inserted within the bore or socket 5 of the member 2, resulting in the bar 1 and the member 2 being locked one to the other.

The dog or arm 6 is fixed to the pivot bolt or pintle 9 extending exteriorly of the socket member 2 and fixed to the extended portions of said pivot bolt or pintle 9 are the rock arms 10 extending in a direction transversely of and across the bar 1. The outer end portions of the arms 10 are connected, as at 11, and threaded through said connected portion is a bolt or headed shank 12. Coacting with the bolt or shank 12 and the connected portion 11 of the arms 10 is a lock nut 14.

15 denotes a substantially U-shaped member having its side arms 16 substantially parallel and slidably disposed through the head 3 at opposite sides of the socket member 2 and disposed through the end portions of the cross member 17 freely engaged with the bar 1. Threaded upon the extremities of each of said side arms 16 and contacting with the inner face of the cross member 17 are the stop members or nuts 18 whereby the outward movement of the member 15 is limited with respect to said cross member 17.

Encircling each of the side arms 16 and interposed between the cross members or heads 3 and 17 is a coil spring 25 operating to constantly urge the member 17 inwardly of the bar 1 whereby the device is maintained in its normal assembly. Overlying the outer face of the head 3 is a plate 19 provided about the central part of its longitudinal margins with the outstanding webs 20 which are connected by a head 21. The outer portion of the head 21 is bifurcated to provide the spaced arms 22 between which the intermediate portion 23 of the member 15 is disposed.

The arms 22 outwardly of said intermediate portion 23 are provided with the alined openings 24 to provide means whereby the head 21 may be suitably anchored or secured to the tractor. It will be understood, however, that the head 21 may be secured to the drawn machine or implement and the bar 1 hereinbefore referred to secured to the tractor as this is a matter of choice or preference.

In the operation of my improved tractor hitch, should the strain or pull imposed thereon become excessive as in the event the machine or implement drawn by the tractor comes into contact with some solid substance, such as a stump or stone, resulting in the movement of the implement or machine being checked, the member 15 will be pulled outwardly and the cross member 17 correspondingly moved until said member 17 comes into contact with the bolt or headed shank 12 whereupon the continued outward movement of the member 17 will forwardly rock the arms 10 resulting in the dog or arm 6 being swung outwardly within the chamber 4 and free of the bar 1, whereupon the socket member 2 and the parts concomitant therewith will be drawn off or separated from the bar 1. The bolt or shank 12, as before stated, is adjustable and is so adjusted to permit a regulation of the time at which the arms 10 will be rocked by contact with the member 17 to regulate the extent of movement of the member 17 under strain or pull before said member 17 will effect a release of the arm or dog 6.

In the present embodiment of my invention, the opposite ends of the socket or bore 5 are open so that the outer or forward end of the bar 1 may extend beyond the forward or outer end of the socket member 2 and seat within a pocket or recess 26 in the plate 19, so that upon stress or push being imposed upon either the bar 1 or the head 21, said bar and head will have unitary movement.

In order that the draw-bar 1 may be conveniently lifted by an occupant of the tractor when it is desired to recouple, I provide the arrangement particularly illustrated in Fig. 3 and wherein two upstanding elongated members 27 rest upon the upper surface of the bar 1. The lower or contacting ends of the members 27 are provided with the laterally directed feet 28 through which pass the bolts 29, said bolts 29 also coacting with a plate 30 underlying the draw-bar 1 and whereby the members 27 are effectively clamped in applied position.

H denotes an elongated handle member having one end portion 31 angularly related with respect to the opposite end portion 32 and the outer or free extremity of the portion 31 is provided with a hand grasp 33. The portion 32 of the handle H extends between the members 27 and is secured thereto by the bolts 34.

When the handle member H is in applied position, the portion 31 thereof inclines or leans toward the tractor so that the occupant of the seat of the tractor may readily take hold of the hand grasp 33 so that the draw-bar may be manipulated to effect a recouple without the necessity of the person getting down from the seat of the tractor or from the platform of the tractor.

From the foregoing description it is thought to be obvious that a tractor hitch constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A hitch of the class described comprising a draw-bar, a socket member in which an end portion of said bar engages, a member slidable upon the draw-bar inwardly of the socket member, a head, yieldable means connecting the head and the slidable member, a movable arm carried by the socket member and coacting with the applied draw-bar to hold the same in applied position, and means associated with said arm and operating upon contact with the slidable member for releasing the arm from the bar.

2. A hitch of the class described comprising a draw-bar, a socket member in which an end portion of said bar engages, a member slidable upon the draw-bar inwardly of the socket member, a head, yieldable means connecting the head and the slidable member, a movable arm carried by the socket member and coacting with the applied draw-bar to hold the same in applied position, and a member operatively engaged with the arm and positioned in the path of travel of the member to be engaged by said member when moving in one direction to release the arm from the bar.

3. A hitch of the class described comprising a draw-bar, a socket member in which an end portion of said bar engages, a member slidable upon the draw-bar inwardly of the socket member, a head, yieldable means connecting the head and the slidable member, a movable arm carried by the socket member and coacting with the applied draw-bar to hold the same in applied position, a member operatively engaged with the arm and positioned in the path of travel of the member to be engaged by said member when moving in one direction to release the arm from the bar, and an element adjustably engaged with the member and with which the sliding member directly engages.

4. A hitch of the class described comprising a draw-bar, a socket member in which an end portion of said bar engages, a member slidable upon the draw-bar inwardly of the socket member, a head, yieldable means connecting the head and the slidable member, a movable arm carried by the socket member and coacting with the applied draw-bar to hold the same in applied position, and means associated with said arm and operating upon contact with the slidable member for releasing the arm from the bar, said head being constantly urged by the yieldable connection toward the socket member.

5. A hitch of the class described comprising a draw-bar, a socket member in which an end portion of said bar engages, a member slidable upon the draw-bar inwardly of the socket member, a head, yieldable means connecting the head and the slidable member, a movable arm carried by the socket member and coacting with the applied draw-bar to hold the same in applied position, and means associated with said arm and operating upon contact with the slidable member for releasing the arm from the bar, and means for constantly urging the arm in a direction to engage the bar.

6. A hitch of the class described comprising a draw-bar, a socket member in which an end portion of said bar engages, a member slidable upon the draw-bar inwardly of the socket member, a head, yieldable means connecting the head and the slidable member, a movable arm carried by the socket member and coacting with the applied draw-bar to hold the same in applied position, and means associated with said arm and operating upon contact with the slidable member for releasing the arm from the bar, said arm being positioned within the socket member.

In testimony whereof I hereunto affix my signature.

JOHN K. MILLER.